Figure 5:
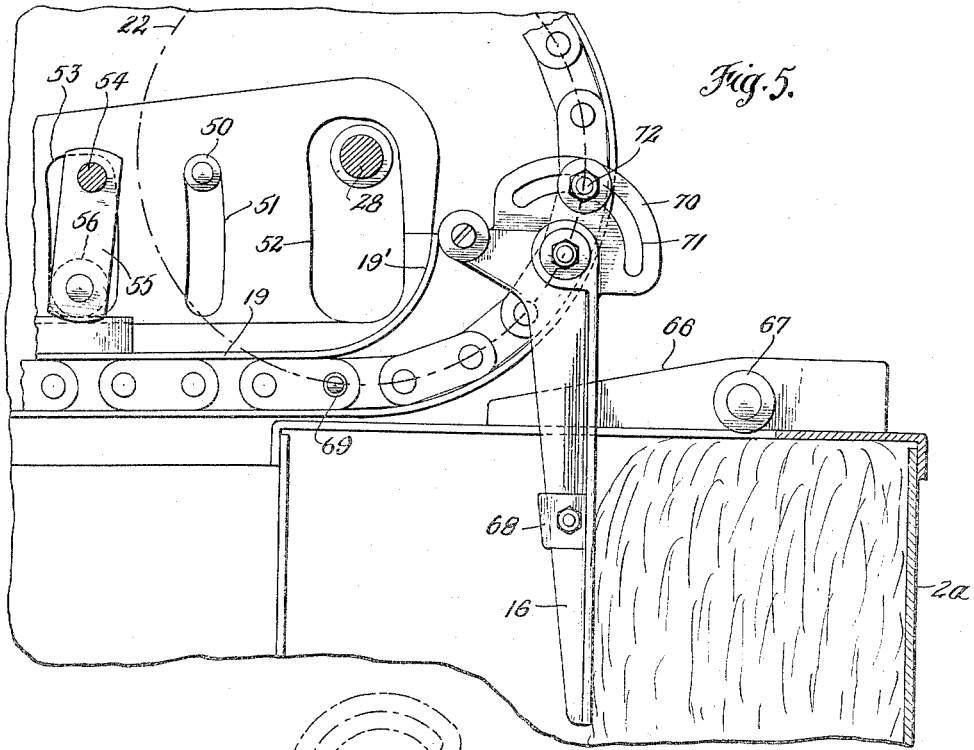

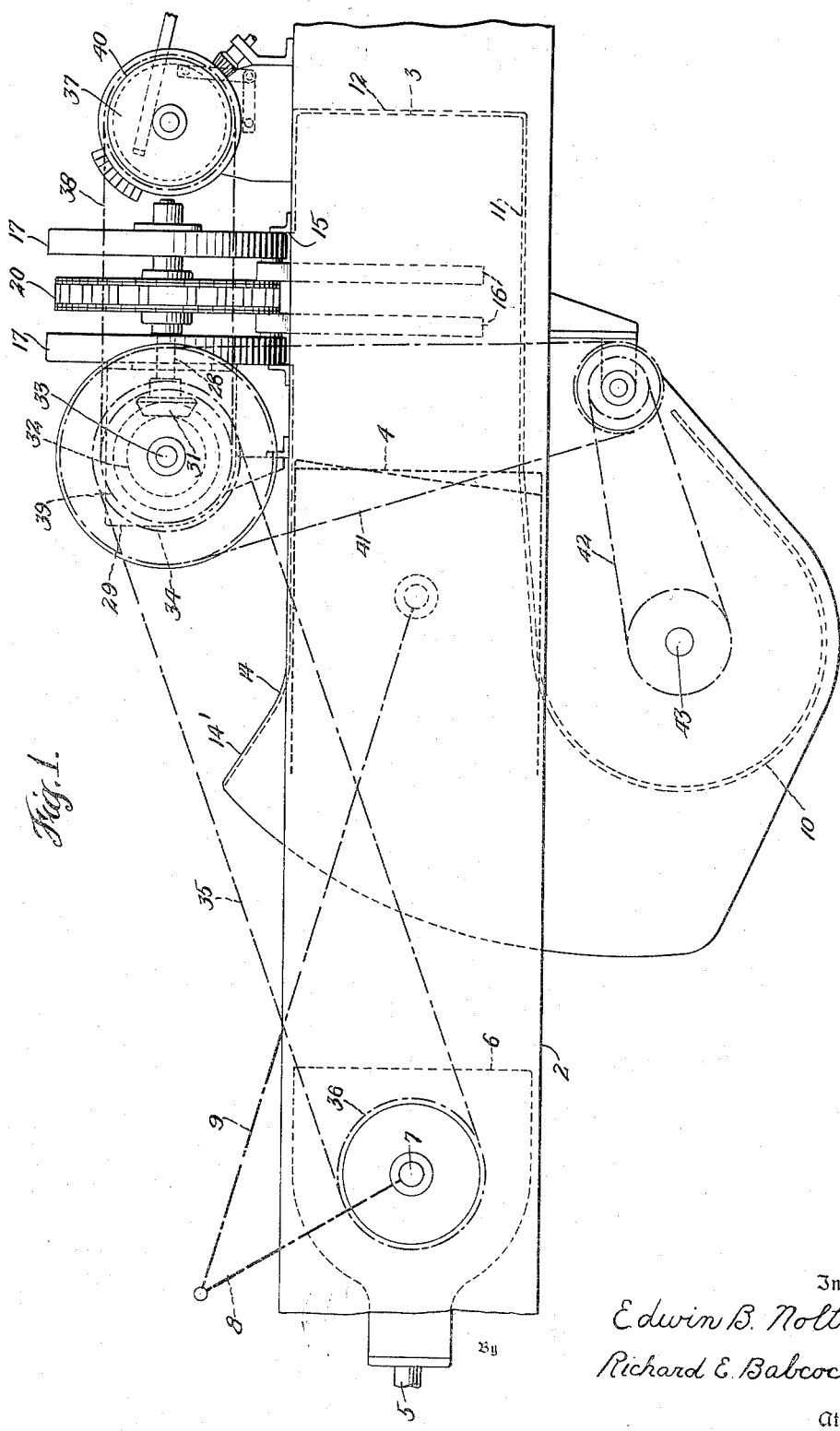

Aug. 2, 1955  E. B. NOLT  2,714,441
FINGER FEED CONVEYERS
Filed May 14, 1954  4 Sheets-Sheet 2
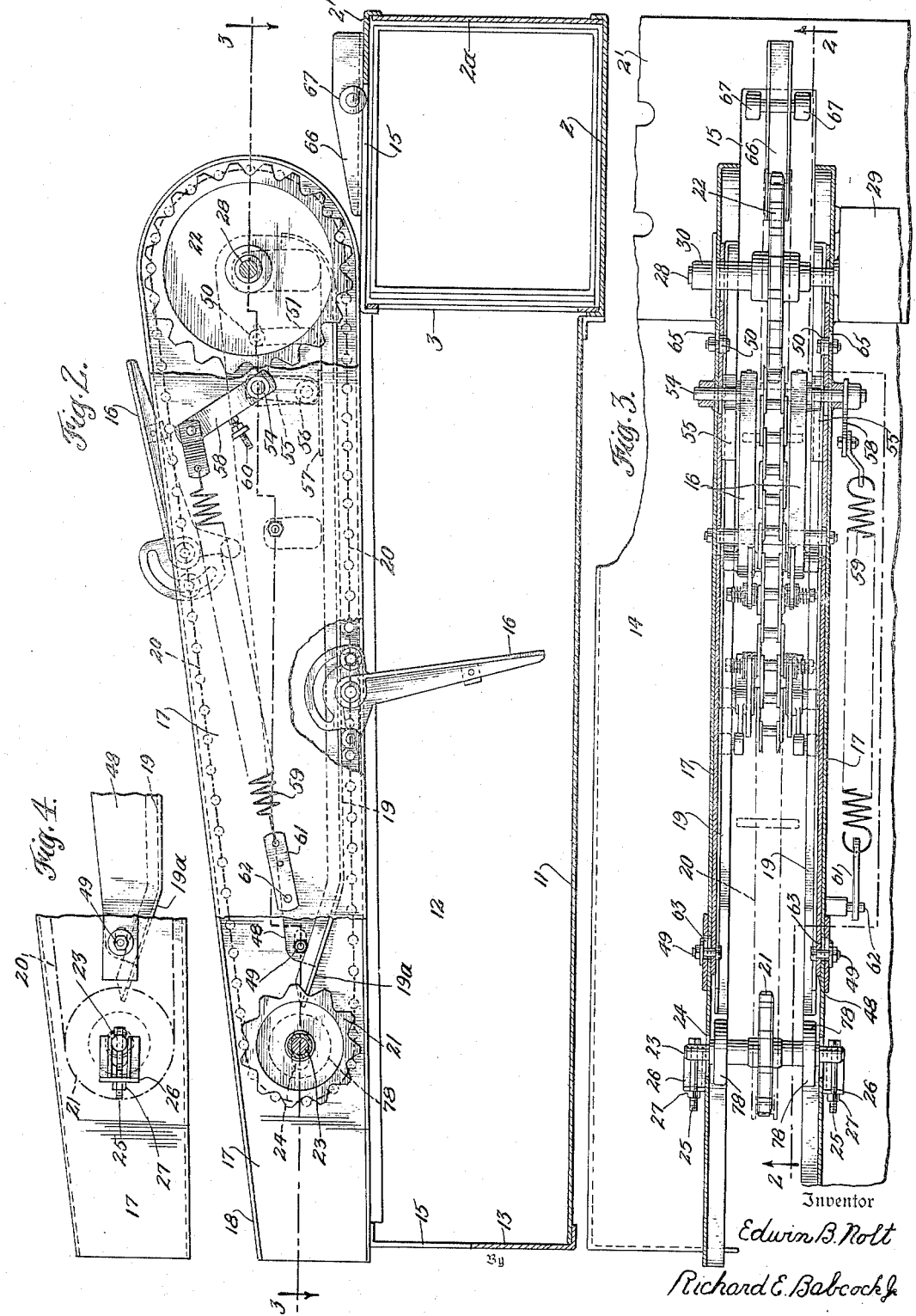
Inventor
Edwin B. Nolt
Richard E. Babcock Jr.
Attorney Aug. 2, 1955 — E. B. NOLT — 2,714,441
FINGER FEED CONVEYERS
Filed May 14, 1954 — 4 Sheets-Sheet 4
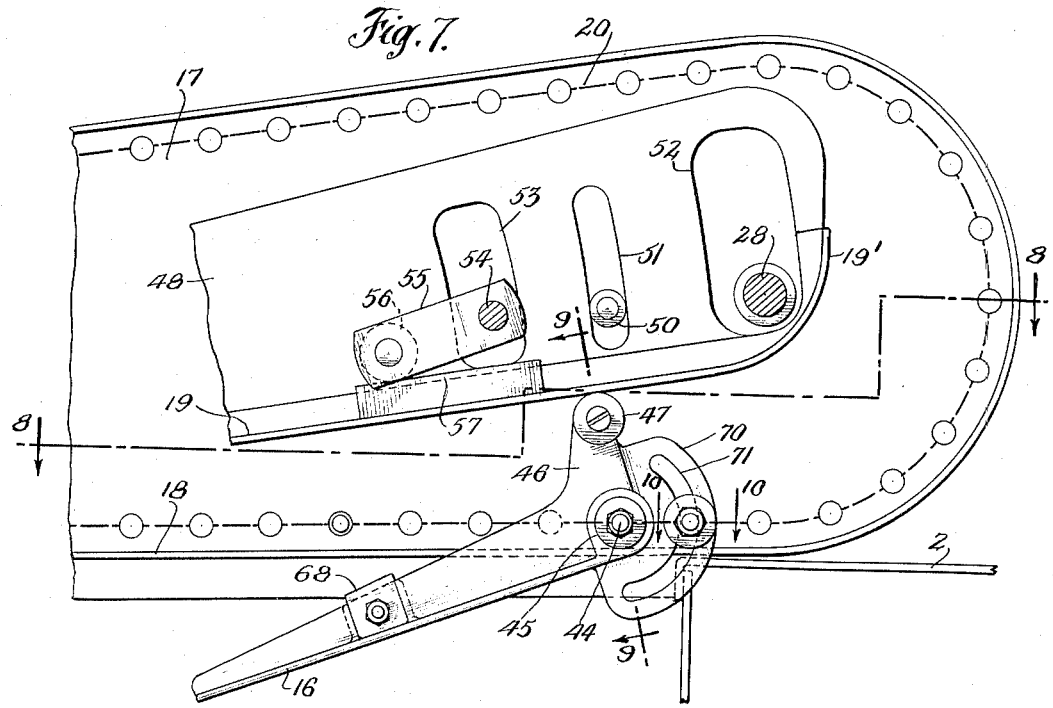
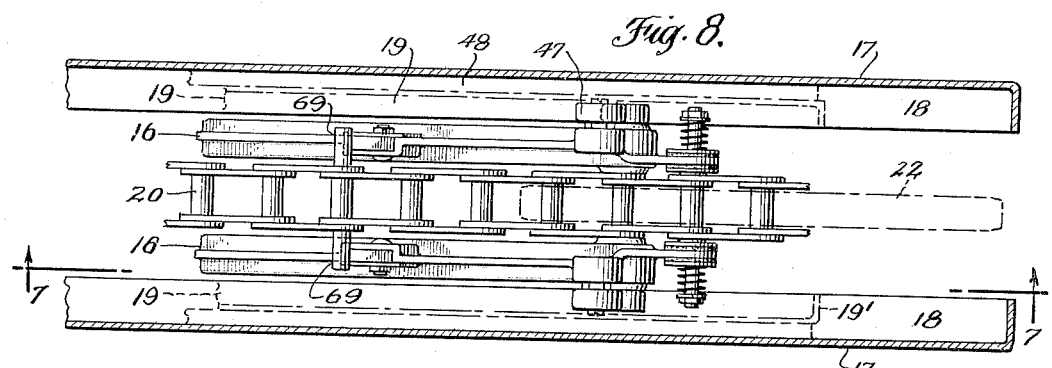
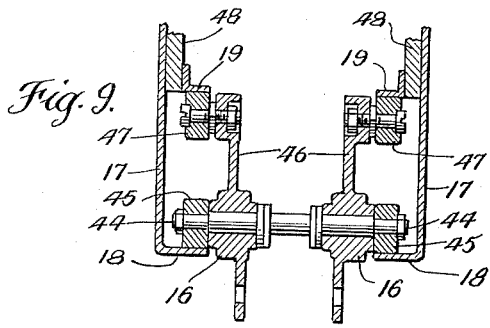
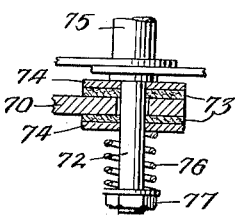
Inventor
Edwin B. Nolt
By Richard E. Babcock Jr.
Attorney

United States Patent Office 2,714,441
Patented Aug. 2, 1955

2,714,441

FINGER FEED CONVEYERS

Edwin B. Nolt, New Holland, Pa., assignor to The Sperry Corporation, New Holland, Pa., a corporation of Delaware Application May 14, 1954, Serial No. 429,761

3 Claims. (Cl. 198—170)

This invention relates to a finger feed conveyer of the type generally disclosed in the Larson Patent 1,936,603 of November 28, 1933, in which pivotally supported feed fingers carried for movement through an endless circuit move over a material supporting surface for a portion of said circuit to sweep material thereover, the fingers having control means cooperating with guide tracks to maintain them erected during the operative portion of their movement.

It is well known in conveyers such as this to render the fingers individually resiliently yieldable whereby they will avoid breakage when encountering jammed material, foreign objects, and the like, although in the prior art this yieldability was attained only by resilient formation of the individual fingers.

In the present invention, however, the several fingers per se are of rigid construction and the guide means with which their control arms cooperate is rendered resiliently displaceable to permit yielding of the respective fingers. It is, accordingly, an object of the invention to provide a novel means capable of successive cooperation with each of a plurality of feed fingers to yieldably retain same in their erected operative positions.

It is a further object to provide for adjusting the degree of resilient pressure urging said guide means to its operative position, whereby the erecting force exerted on the several fingers may be changed by adjustment of a single part or element. Moreover, by completely releasing the pressure means, it is made possible to easily swing the feed fingers out of the way to permit removal of jammed material or objects.

It is a still further object to provide means permitting bodily adjustment of the yieldable guide means or rail without impairing its yielding function in order to vary the operative positions of the respective fingers at predetermined points in their movement. In particular, whereas in the preferred embodiment, the fingers are utilized to deliver hay into a bale chamber and compact it against the far side thereof at the end of their operative movement, such adjustment may be utilized to attain the desired degree of approach of the feed fingers to the said far side and thus control the degree of such compacting or precompressing.

Also, in accordance with the invention, there is provided a novel arrangement of stripper bar projecting between the fingers of adjoining pairs as they are retracted upwardly from the bale chamber to strip them of hay, this stripper bar serving also as a mounting for control means in the form of stops which are disposed for engagement with the feed fingers as they pass on either side of the stripper bar to move said fingers toward a reclining position.

Also, the invention includes the provision of a novel arrangement of friction means associated with the respective fingers tending to frictionally resist any displacement of these fingers about their pivotal mountings on the conveyer.

Figure 6:
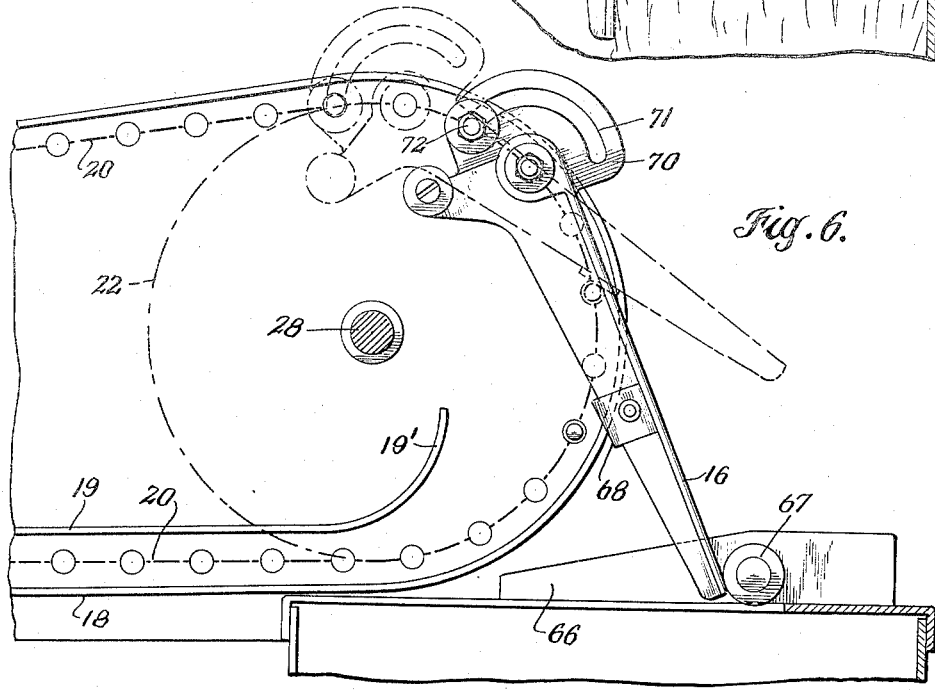

The foregoing, as well as other incidental objects and advantages, are attained by the mechanism illustrated in the accompanying drawings in which:

Figure 1 is a diagrammatic elevational view illustrating an application of a finger feed device constructed in accordance with the invention to a baler;

Figure 2, a partly side elevational and partly sectional view as indicated by the line 2—2 of Figure 3;

Figure 3, a plan section taken on the line 3—3 of Figure 2 and showing a portion of the upper chain run and the upper feed finger in plan view;

Figure 4, a fragmentary side elevation of the left hand end portion of Figure 2;

Figure 5, an enlarged fragmentary view showing one of the fingers in a position of packing hay into the bale case;

Figure 6, a similar view showing in full lines how the finger is tripped or collapsed when it passes through an empty bale case and showing in dot and dash lines the position of the finger when it is engaged by a stop pin carried by the chain;

Figure 7, a fragmentary longitudinal section taken on the line 7—7 of Figure 8 showing the position of the finger due to an overload condition;

Figure 8, a plan section on the line 8—8 of Figure 7;

Figure 9, a cross-section on the line 9—9 of Figure 7; and,

Figure 10, a cross-section on the line 10—10 of Figure 7.

The finger feed mechanism of the invention is illustrated as operatively associated with a conventional automatic pick-up hay baler which, as diagrammatically illustrated in Figure 1, comprises a longitudinally extending bale case 2 of rectangular cross-section into which hay is fed through an opening 3 in one side for compression by a plunger 4, reciprocating in the bale case 2.

Driving power for the plunger is delivered through a shaft 5 and gear box 6 to rotate a crank shaft 7, the crank arm 8 of which is operatively connected by pitman 9 to the plunger 4 to cause reciprocation thereof. Shaft 5 may be powered from any suitable source, as for instance, either an engine carried by the baler or a power take-off from a usual farm tractor which propels the baler.

A conventional pick-up mechanism generally designated 10 in Figure 1 is disposed to pick up windrowed hay and deliver it rearwardly onto a feed table 11 which extends laterally from the lower edge of the feed opening 3 whereby the infeed mechanism of the invention may sweep such hay across the feed table and through the feed opening 3 into the bale chamber defined by the bale case 2.

Rearward movement of hay on the feed table 11 is limited by an upstanding rear wall 12 and the hay is laterally confined at the rear end of the feed table by an upstanding end wall 13. A cover or top 14 shown in Figure 1 is supported over the feed table between the bale case 2 and the rear walls 12 and 13 respectively. This top preferably extends forwardly over the pick-up 10 and is upwardly flared at its forward edge as at 14' to better receive and hold down the incoming hay.

The table end wall 13, top 14, and bale case top wall 2' are respectively formed with interconnected portions of a continuous slot 15 through which operates the infeed conveyer of the invention. It will be noted in Figure 2 that the slot 15 in bale case 2 communicates with the feed opening 3.

Supported over the feed table 11 with its delivery end over the bale case 2 is an endless conveyer which carries feed fingers 16 preferably in successive pairs for successive sweeping movement over the feed table and into the bale case through the feed opening 3 and the transverse slot 15. A suitable supporting frame for the conveyer may comprise a pair of relative spaced parallel frame members 17—17 of rigid sheet metal construction extending between and supported by the end wall 13 of the feed table and the top wall 2' of the bale case. The arrangement is such that the members 17 are disposed at opposite sides of the slot 15 in the bale case top.

Marginal flanges 18—18 on the respective frame members 17—17 are directed toward each other to lend rigidity to the respective members and also to the end that the lower portions or sections of the respective flanges 18 may function as stationary guide rails for cooperation with moveable guide rails or means 19 thereabove to control the feed fingers 16 in the manner hereinafter described.

The endless conveyer 20 in the preferred embodiment assumes the form of a conventional sprocket chain disposed around a pair of laterally spaced sprocket wheels 21—21 operatively supported between the respective frame members 17—17. Sprocket wheel 21 has its hub rotatably journaled on a dead shaft 23 supported transversely between the members 17 through coextensive lateral slots 24 in these members which permit lateral adjustment of the shaft 23 and sprocket 21 for the purpose of taking up slack in the conveyer 20. Such adjustment may be accomplished by threaded adjusting means including the bolt 25—25 interconnecting the opposite ends of shaft 23 respectively with the brackets 26—26 fixed on the outer faces of the frame members 17, whereby nuts 27 threaded on the respective bolts in engagement with the brackets may be rotated to effect the desired adjustments.

As shown in Figures 1 and 3, drive sprocket 22 is keyed on shaft 28 which projects through and between the frame members 17 from a gear box 29 fixedly disposed adjacent the outer face of one of the frame members 17. The gear box 29 itself rotatably supports one end of shaft 28 while the other end is journaled in a bearing 30 secured on the outer frame member 17 as best shown in Figure 3. Interiorly of the gear box 29 the shaft 28 which constitutes the output shaft of the gear box has a bevelled gear 31 keyed thereon in mesh with a bevelled gear 32 fixed on the gear box input shaft 33. Exteriorly of the gear box 29 the input shaft fixedly supports a sprocket 34 through which it is driven by a chain 35 from sprocket 36 keyed on the outer end of the bale crank shaft 7.

Thus it will be seen that through its driven connection with the baler crank shaft 7 the conveyer 20 is driven in timed relation to the reciprocation of the bale plunger, and the feed fingers 16 on the conveyer 20 are positioned or grouped so that pairs of such fingers successively enter the bale casing 2 to deliver charges of hay thereinto each time the plunger is retracted.

The conventional knotter mechanism 37 of the baler may be similarly driven in timed relation to the plunger as is customary through a chain drive 38 from a further sprocket 39 on the gear box input shaft 33 to a sprocket 40 keyed on the knotter shaft. Also, it has been found convenient to transmit driving power from the gear box shaft 33 through the interconnected flexible drives 41 and 42 to the rotatable shaft 43 of the pick-up mechanism 10.

The foregoing general arrangement and combination of the baler and infeed mechanism is substantially as disclosed in my copending application Serial No. 345,773, filed March 31, 1953, for Hay Baler Infeed Mechanism. Accordingly, such general combination is not claimed per se as part of the present invention, but is thus briefly described merely in order to facilitate an understanding of the present invention and the conditions under which it is adapted to operate.

The present invention relates primarily to improvements in the conveyor mechanism for the purpose of permitting yielding of the feed fingers 16 upon encountering obstacles, while maintaining these fingers rigidly positioned at all times short of their yielding point so that they may more efficiently function to precompress the hay against the bale plunger and/or against the far side of the bale casing. To this end, the conveyor chain 20 carries one or more cross pins or bars 44 the ends of which project on either side of the chain. Pivoted on each such pin 44 on opposite sides of the chain 20 are similar feed fingers 16—16. On the outer ends of the respective pins 44 are journaled rollers 45 which project from opposite sides of the chain and fingers for movement between the upper and lower guide rails 19 and 18, respectively. Rigidly connected to the hub end of each such finger 16 and preferably integral therewith is a control arm 46 extending generally radially from the pivot 44 and preferably including guide means such as a roller 47 journaled at the free end thereof for movement between the rails 18 and 19.

It will be noted that the rollers 45 and 47 of each feed finger 16 are spaced apart in a direction substantially at right angles to the major axis of the finger and are of diameters approximately equal to the normal distance between the rails 18 and 19. Thus, the rollers 45 and 47 which control each finger will normally cooperate with the rails to maintain each finger erected at substantially right angles to the chain 20.

Otherwise stated, the control arm 46 and rollers 45 and 47, together with the hub portion of each finger may be regarded as a carriage or a slide which is guided for movement between the rails 18 and 19 and which supports the finger for sweeping movement over the feed table 11, the carriage being of a length greater than the distance between the rails 18 and 19 to maintain the finger 16 erect unless sufficient force is exerted thereon to cause the carriage to spread the rails apart.

It is desired that the fingers 16 remain fully erected or perpendicular throughout a predetermined range of resistance to their movement in order that they may function efficiently to sweep the hay and precompress it against the side of the bale plunger 4. However, such fingers 16 should be quickly yieldable about their pivotal connections 44 in the event they encounter heavy foreign objects or unusual accumulations of hay. Such yielding not only protects the fingers 16 and the conveyer 20 itself against breakage, but also it decreases the likelihood of foreign objects being carried into the bale chamber where they might damage the baler.

This end is attained by rendering one of the rails 19 resiliently yieldably displaceable away from its cooperating rail to thus permit tilting of the finger 16 and its carriage when the finger encounters excessive resistance to its movement.

Accordingly, in the preferred embodiment, the upper rail 19 includes and is carried by a supporting plate 48 which is pivoted at 49 (see Figure 2) to its associated frame members 17 for vertical swinging movement. A roller stop 50 fixed on each frame member 17 and received in arcuate slot 51 in the associated mounting plate cooperates with the ends of the slot to limit the swinging of the rail 19 about its pivot 49. Normally the stop 50 abuts against the upper end of slot 51 as in Figures 2 and 5 to maintain the upper rail 19 generally parallel to lower rail 18. However, the relationship between the slot 51 and stop 50 is such as to permit upward displacement of the rail 19 as shown in Figure 7.

In addition to the slot 51, each mounting plate 48 is provided with additional arcuate slots 52 and 53 to receive and permit its movement relative to drive sprocket shaft 28 and the rock shaft 54 which is rockably supported between the frame members 17—17. In the present embodiment the rock shaft 54 functions as an element of the means for resiliently yieldably maintaining the rail 19 in its normal operating position. As shown in Figures 2 and 3, such means includes a crank arm 55 fixed on the rock shaft 54, a roller 56 being supported at its free end for rolling engagement with a follower plate or element 57 carried by rail 19. A further crank arm 58 fixed on one end of the rock shaft 54 externally of the frame member 17 is resiliently biased by a tension spring 59 in a direction to urge the arm 55 against the plate 57. Preferably an adjustable threaded stop 60 mounted on a bracket on the outer face of the associated frame members 17 cooperates with the crank arm 58 to limit its rocking movement under the influence of spring 59.

It will be seen that one end of spring 59 is connected to the crank arm 58 while the other end of the spring is connected to an anchor bracket 61 having a plurality of holes therethrough adapted to selectively receive the pin 62 secured to the adjacent frame member 17. By positioning the bracket 61 to receive the pin 62 in different holes it is apparent that the tension of the spring 59, and thus, the resistance to yielding of the finger 16 may be varied. Moreover, by adjustment of but a single element, it is possible to vary the resistance to yielding of each of the plurality of fingers 16. Similarly, by removal of the bracket 61 from pin 62 it is possible to release the tension of the spring 59 and render the finger 16 easily yieldable to facilitate the clearing away of jammed material or foreign objects.

It is important to note that when the crank arm 55 acts on the rail 19 to maintain the finger 16 in erected condition, as in Figure 2, the crank arm 55 will extend nearly perpendicularly to rail 19 to exert a toggle action thereagainst, and thus, maintain the finger 16 in erected position with a maximum degree of force. However, once a sufficient degree of force is exerted against one of the fingers 16 to commence upward swinging of the rail 19 and rocking of the shaft 54, it will be seen that the rocking of the crank arm 55 will enable the rail 19 to act on it with a constantly increasing advantage as the finger is further retracted. Thus, once yielding of the finger 16 has commenced, it may be continued with a constantly diminishing opposition which will permit the finger to readily ride over foreign objects on the table 11 without carrying them into the bale chamber defined by bale case 2. This is important also for the purpose of permitting the fingers 16 to efficiently compress the hay against the side of the bale plunger 4 as they move toward said plunger before the latter is completely retracted from their path and also to attain more efficient packing or consolidating of the hay into the upper corner of the bale chamber. This action is to be distinguished from the yielding action of the usual spring tine or the like which, of course, exerts its minimum resistance to deflection when in erected condition.

At the delivery end of the conveyer it will be noted that the upper rails 19 extend partially around and eccentrically to the axis of the sprocket 22 for continued coaction with the control arm 46 as the fingers 16 are withdrawn upwardly around sprocket 22 through the slot 15 in the bale case. By such coaction, the end portions of rails 19 govern the extent to which the free ends of the fingers 16 approach the far wall 2a of the bale case 2 to compact the hay thereagainst. In order to permit adjustment of the degree of approach of the fingers to the far wall 2a, as well as of the angle of their withdrawal, provision is preferably made for bodily adjusting the rail 19 transversely to the bale case.

For this purpose, and as shown in Figures 2 and 3, the pivot 49 of each rail 19 is adjustable along the lateral slot 63 in its associated frame member 17 so that loosening of the nut 64 threaded on said pivot will permit adjustment of the rail 19 to a new location. Each stop 50 is similarly mounted for adjustment along a slot 65 in its respective frame member 17. However, the slots 52 and 53 which receive shafts 28 and 54, are preferably of sufficient lateral width or extent to permit unobstructed adjustment of the rails 19—19 throughout the full range permitted by slots 63 and 65.

During the initial stages of the upward withdrawal of a pair of fingers 16 from the bale case 2 around sprocket 22 as illustrated in Figure 5, the upwardly curved end 19' of rail 19 will normally rigidly maintain the fingers in engagement with the hay H in an approximately perpendicular position to efficiently compact the hay against the far side wall 2a of the bale case and into the upper far corner of the bale case. The pressure of the hay will normally maintain the finger control arms 46 in operative engagement with the rail 19 and when the rollers of the control arms 46 ride off the rail ends 19' in moving upwardly around the sprocket, will urge the fingers to the left toward a reclining position as they leave the bale case 2.

Simultaneously, as the fingers 16 are retracted upwardly from the bale case 2, they are stripped of hay by a stripper bar 66 fixed on the top of the bale case with its free end extending in the plane of movement of the conveyer 20 and positioned to project between the fingers 16 of adjoining pairs during their retractive movement.

In the event the baler should be operated without picking up hay, or in the event a full charge of hay is not delivered in front of a pair of fingers 16—16, there may be some tendency for these fingers to slap against the wall 2a of the bale case and the top thereof at the end edge of slot 15 with consequent noise and risk of damage to the parts involved. In order to prevent this, stops or rollers 67 are mounted on opposite sides of the stripper bar 66 in the paths of retraction of their respective fingers 16 of each pair to thus insure the swinging of the fingers to reclining positions as they leave the bale chamber. Such swinging may be limited by engagement between stops 68 and 69 carried by the fingers and the chain respectively for abutment with each other.

Since centrifugal force acting on the fingers during their passage around the sprocket 22 may tend to swing them toward erect positions as they leave the bale chamber with the creation of undesired forces and accompanying noisy operation, it is desired to counteract this tendency by the provision of suitable braking or dampening means. Such means is exemplified by the braking quadrant 70 formed integrally with the hub or carriage portion of each finger 16 and having an arcuate slot 71 therethrough concentric with its pivot 44. As shown in Figures 7, 8, and 10, a cross pin 72 carried by the chain 20 projects through the slotted quadrant plates 70 of the fingers on either side of the chain 20 and slideably supports braking elements 73 in operative frictional engagement with the opposite sides of each quadrant. Each such braking element or disc 73 is formed of suitable frictional material and is preferably associated with a stiff backing plate or washer 74 which also is slideable on the pin 72. It will be seen that pin 72 is slideably disposed through a tubular cross piece 75 of the chain 20 and spring 76 compressed on the outer ends of the pin 72 between nuts 77 and their adjacent washers 74 serve to resiliently compress each set of braking means between said spring and the adjacent end of the chain cross piece 75, thereby maintaining the friction disc 73 at all times in operative resilient frictional engagement with their cooperating plates 70. It will be understood that the several fingers 16 are sufficiently axially moveable on their pivots 44 with the braking disc 73 to permit the desired action to take place.

Thus, it will be seen that as the fingers 16 return to their starting point, with the inoperative upper or return run of the chain, they will be in reclining positions until they reach sprocket 21, at which time the rollers on the control arms 46 will simultaneously contact rollers 78—78 disposed in their paths on the same shaft 23 which supports sprocket 21. The ensuing cooperation between the control arms 46 and rollers 78 will erect the fingers 16 as they move around the sprocket 21 preparatory to a repeated operative passage with the lower run of the chain 20.

Preferably the outer end of rail 19 adjacent the sprocket 21 will be deflected upwardly slightly at 19a to provide ample clearance for reception therebeneath of the control arms 46 as these disengage the rollers 78 to commence their operative movement.

In the operation of the invention which is believed to be apparent from the foregoing description, the separate pairs of fingers 16—16 will move successively over the feed table 11 to sweep the incoming hay from the pick-up over the surface of the table and into the bale chamber within the casing 2. The fingers will, of course, move toward and into the chamber in timed relation to the reciprocating plunger 4 and the timing is such that while the plunger still projects across the feed opening 3, the approaching fingers 16 will precompress or consolidate hay against its adjacent side wall. Then after the plunger is retracted, said fingers 16 will sweep the hay into the bale chamber and against the far wall 2a where they will again exert a compacting or precompressing action and will, during their upward retraction movement, serve also to pack the hay into the far upper corner of the bale case remote from the feed opening 3.

For the purpose of enabling the fingers 16 to better exert such precompressing action, as well as their normal sweeping function, the pressure applied to the upper rail 19 through the crank arm 55 will be at its maximum when the fingers are in erect condition. However, once the fingers encounter a foreign object or the table 11 becomes so choked with hay in advance of these fingers as to commence their retraction or reclining movement, the fingers will thereafter be urged toward erect position with a constantly diminishing force as their yielding is increased, whereby they may easily ride over such foreign objects without sweeping them into the bale chamber. The extent of force acting on the fingers to resist their yielding may be adjusted either by means of adjusting the position of the bracket 61 with regard to pin 62 as abovementioned or alternatively by adjustment of the threaded stop 60 to act through the arm 58 and thereby vary the position at which the rock shaft 54 comes to rest.

In any event, the rails 19 are interconnected through the common rock shaft 54 for simultaneous operation and adjustment whereby the action of all of the fingers may be adjusted and controlled through the common rock shaft 54 and its associated adjusting and control means.

In this application I have shown and described only the preferred embodiment of the invention simply by way of illustration of the preferred mode contemplated by me of carrying out the invention. However, I recognize that the invention is capable of various modifications and that its several details may be altered in various manners. Accordingly, the drawings and description herein are to be considered merely as illustrative in nature and not as excluding other embodiments.

Having thus described the invention, I claim:

1. In conveying mechanism of the class in which pivotally mounted feed fingers carried for movement in sweeping relation through a predetermined operative path over a supporting surface have control arms respectively cooperating with a guide rail to maintain said fingers erected, the combination comprising a guide rail normally extending parallel to said path, means moveably supporting said rail for movement transversely to said path, a crank arm having a free end operatively engaging said rail, means mounting said arm for angular movement about one end thereof, resilient means urging said arm toward perpendicular relationship with said rail, and stop means coacting with said arm to prevent same from reaching such perpendicular relationship.

2. A conveying mechanism comprising a longitudinally extending guide rail, means yieldably resiliently supporting said rail against transverse displacement, a conveyer element moving substantially parallel to said rail, a feed finger pivoted on said element, a control arm carried by said finger in operative engagement with said rail, said arm normally coacting with said rail to maintain the finger erected, the resilient yielding of said rail responsive to swinging forces imposed on said finger serving to permit movement of the finger toward reclining position, in combination with a crank arm, means mounting said crank arm for angular movement about one end thereof, a roller carried by the free end of said arm in operative engagement with said rail, resilient means urging said arm toward perpendicular relationship with said rail, and stop means coacting with said arm to prevent same from reaching such perpendicular relationship.

3. The combination of claim 2 in which means are provided for supporting said rail for longitudinal adjustment.

References Cited in the file of this patent

UNITED STATES PATENTS

| | | |
|---|---|---|
| 898,250 | Mitchell | Sept. 8, 1908 |
| 1,740,582 | Farmer | Dec. 24, 1929 |
| 2,187,026 | Hamachek, Jr. | Jan. 16, 1940 |

FOREIGN PATENTS

| | | |
|---|---|---|
| 454,952 | Great Britain | Oct. 12, 1936 |